United States Patent
Wei et al.

(10) Patent No.: US 9,720,297 B2
(45) Date of Patent: Aug. 1, 2017

(54) ARRAY SUBSTRATE FOR IMPROVING THE SPEED OF DISCHARGE OF STORAGE CAPACITANCE CORRESPONDING TO A PIXEL ELECTRODE, AND DISPLAY PANEL HAVING THE SAME

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Xiangdong Wei, Beijing (CN); Xueguang Hao, Beijing (CN); Cheng Li, Beijing (CN); Seongjun An, Beijing (CN); Bongyeol Ryu, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 14/548,981

(22) Filed: Nov. 20, 2014

(65) Prior Publication Data

US 2015/0325188 A1    Nov. 12, 2015

(30) Foreign Application Priority Data

May 8, 2014  (CN) .......................... 2014 1 0192766

(51) Int. Cl.
*G02F 1/1362* (2006.01)
*G09G 3/36* (2006.01)

(52) U.S. Cl.
CPC .. *G02F 1/136286* (2013.01); *G02F 1/136204* (2013.01); *G09G 3/3648* (2013.01);
(Continued)

(58) Field of Classification Search
CPC ......... G09G 3/3648; G09G 2300/0404; G09G 2300/0478; G09G 2300/0426
See application file for complete search history.

(56) References Cited

U.S. PATENT DOCUMENTS 6,043,971 A * 3/2000 Song ................. G02F 1/136204
                                                    349/40
6,791,632 B2 * 9/2004 Lee ................... G02F 1/136204
                                                    349/40
(Continued)

FOREIGN PATENT DOCUMENTS

CN    1396656 A    2/2003
CN    103515941 A    1/2014
(Continued)

OTHER PUBLICATIONS

1st office action issued in Chinese application No. 201410192766.4 dated Feb. 26, 2016.

*Primary Examiner* — Claire X Pappas
*Assistant Examiner* — Robert Stone
(74) *Attorney, Agent, or Firm* — Nath, Goldberg & Meyer; Joshua B. Goldberg; Christopher Thomas

(57) ABSTRACT

The present invention provides an array substrate and a display panel. The array substrate comprises a plurality of data lines and a plurality of common electrode lines, wherein, the array substrate further comprises at least one discharge unit, each discharge unit corresponds to one of the plurality of data lines and is connected between the corresponding data line and one of the plurality of common electrode lines, and each discharge unit can selectively conduct the data line to the common electrode line connected thereto. The display panel comprises the array substrate. In the present invention, the discharge unit can selectively conduct the data line connected thereto to the common electrode line connected thereto, to enable fast (Continued)

discharge of the storage capacitance and reduce occurrence of afterimage phenomenon.

16 Claims, 2 Drawing Sheets

(52) U.S. Cl.
CPC ............ *G02F 2001/136254* (2013.01); *G09G 2300/0404* (2013.01); *G09G 2300/0426* (2013.01); *G09G 2300/0478* (2013.01)

(56) References Cited

U.S. PATENT DOCUMENTS

| | | | | |
|---|---|---|---|---|
| 2001/0045997 | A1* | 11/2001 | Kim | G02F 1/136204 349/40 |
| 2003/0020845 | A1* | 1/2003 | Lee | G02F 1/136204 349/40 |
| 2003/0107127 | A1* | 6/2003 | Murai | G02F 1/136204 257/724 |
| 2004/0145556 | A1* | 7/2004 | Nakanishi | G09G 3/006 345/99 |
| 2006/0001787 | A1* | 1/2006 | Lee | G02F 1/136204 349/40 |
| 2006/0022932 | A1* | 2/2006 | Sagawa | G09G 3/3648 345/98 |
| 2006/0119757 | A1* | 6/2006 | Tsao | G02F 1/136204 349/40 |
| 2007/0024315 | A1* | 2/2007 | Kim | G09G 3/006 324/760.02 |
| 2007/0268420 | A1* | 11/2007 | Tsai | G02F 1/13452 349/40 |
| 2008/0001876 | A1* | 1/2008 | Ito | G09G 3/3655 345/87 |
| 2010/0026921 | A1* | 2/2010 | Tsubata | G09G 3/3648 349/37 |
| 2010/0072470 | A1* | 3/2010 | Yamazaki | H01L 27/0266 257/43 |
| 2010/0073009 | A1* | 3/2010 | Wang | G09G 3/006 324/537 |
| 2010/0156770 | A1* | 6/2010 | Shin | G09G 3/3648 345/87 |
| 2011/0227886 | A1* | 9/2011 | Lee | G02B 27/26 345/204 |
| 2013/0092934 | A1* | 4/2013 | Yamazaki | H01L 27/0266 257/43 |
| 2013/0175525 | A1* | 7/2013 | Yamazaki | H01L 27/0248 257/43 |
| 2014/0126093 | A1* | 5/2014 | Duan | G02F 1/136204 361/56 |

FOREIGN PATENT DOCUMENTS

| | | |
|---|---|---|
| CN | 103698911 A | 4/2014 |
| CN | 203811952 U | 9/2014 |
| TW | 2010030923 A1 | 8/2016 |

* cited by examiner

ARRAY SUBSTRATE FOR IMPROVING THE SPEED OF DISCHARGE OF STORAGE CAPACITANCE CORRESPONDING TO A PIXEL ELECTRODE, AND DISPLAY PANEL HAVING THE SAME

FIELD OF THE INVENTION

The present invention relates to the field of liquid crystal display technology, and particularly to an array substrate and a display panel.

BACKGROUND OF THE INVENTION

Thin Film transistor liquid crystal display (TFT-LCD), due to its high image quality, low power consumption, low cost and the like, has been widely used after decades of development.

In the working process of a liquid crystal display, when the liquid crystal liquid displays an image, a thin film transistor corresponding to a pixel electrode is turned on, a signal may be transmitted to the pixel electrode through a data line, that is, storage capacitance formed by the pixel electrode and a common electrode is charged; when the liquid crystal display does not display an image (i.e., at a time interval between two image frames), the storage capacitance formed by the pixel electrode and the common electrode discharges. However, with the improvement of display resolution, since the speed of discharge of the storage capacitance corresponding to the pixel electrode is limited, afterimage phenomenon may occur in the process of switching two image frames, thus the production quality is lowered.

Therefore, how to improve the speed of discharge of the storage capacitance corresponding to the pixel electrode becomes a technical problem required to be solved urgently in the art.

SUMMARY OF THE INVENTION

To solve the above problem, an object of the present invention is to provide an array substrate and a display panel including the array substrate, which can improve the speed of discharge of storage capacitance corresponding to a pixel electrode.

To achieve the above object, the present invention provides an array substrate, comprising a plurality of data lines and a plurality of common electrode lines, wherein, the array substrate further comprises at least one discharge unit, each discharge unit corresponds to one of the plurality of data lines and is connected between the corresponding data line and one of the plurality of common electrode lines, and each discharge unit is capable of selectively conducting the data line connected thereto to the common electrode line connected thereto.

Preferably, the array substrate further comprises a driving circuit, each discharge unit comprises a first thin film transistor, a gate of which is connected to an output terminal of the driving circuit, one of a source and a drain of which is connected to the data line and the other is connected to the common electrode line, and the driving circuit is capable of outputting a control signal which selectively turn on the first thin film transistor.

Preferably, the array substrate further comprises a switching signal line connected to the output terminal of the driving circuit, and the gate of each first thin film transistor is connected to the switching signal line, so as to be connected to the output terminal of the driving circuit via the switching signal line.

Preferably, the array substrate comprises a plurality of discharge units, the discharge units are in a one-to-one correspondence with the plurality of data lines, and are provided between the plurality of data lines and one of the common electrode lines, respectively.

Preferably, the one of the common electrode lines connected to the plurality of discharge units is the first common electrode line of the plurality of common electrode lines.

Preferably, the array substrate further comprises at least one electrostatic protection unit, each electrostatic protection unit corresponds to one of the plurality of data lines and is provided between the corresponding data line and the switching signal line, and static electricity on the data line is released to the switching signal line via the electrostatic protection unit.

Preferably, each of the at least one electrostatic protection unit comprises a second thin film transistor and a third thin film transistor, wherein, the second thin film transistor is a N-type thin film transistor and the third thin film transistor is a P-type thin film transistor, or the second thin film transistor is a P-type thin film transistor and the third thin film transistor is a N-type thin film transistor; and one of a source and a drain of the second thin film transistor is connected to the switching signal line and the other is connected to the data line, a gate of the second thin film transistor is connected to the switching signal line, one of a source and a drain of the third thin film transistor is connected to the data line and the other is connected to the switching signal line, a gate of the third thin film transistor is connected to the data line.

Preferably, the array substrate comprises a plurality of electrostatic protection units, which are in a one-to-one correspondence with the plurality of data lines.

Preferably, the array substrate further comprises a test unit, which is connected to at least one data line, and is configured to provide a test signal to the at least one data line.

Preferably, the test unit comprises a test line and at least one fourth thin film transistor, each of the fourth thin film transistors corresponds to one data line and is connected between the corresponding data line and the test line, a gate of each fourth thin film transistor is connected to the switching signal line, one of a source and a drain of each fourth thin film transistor is connected to the corresponding data line and the other is connected to the test line.

Preferably, a red pixel electrode, a green pixel electrode and a blue pixel electrode are provided in each pixel region of the array substrate, the red pixel electrode, the green pixel electrode and the blue pixel electrode are connected to the corresponding data lines respectively, and the test line comprises a first test line for providing a test signal to the red pixel electrode, a second test line for providing a test signal to the green pixel electrode and a third test line for providing a test signal to the blue pixel electrode.

Preferably, the test unit comprises a plurality of fourth thin film transistors, which are in a one-to-one correspondence with the plurality of data lines.

Preferably, the test unit comprises a plurality of fourth thin film transistors, which are in a one-to-one correspondence with the plurality of data lines, and gates of the fourth thin film transistors respectively corresponding to the red pixel electrode, the green pixel electrode and the blue pixel electrode in a same pixel region are connected with each other.

Accordingly, the present invention also provides a display panel, comprising an array substrate, which is the array substrate provided by the present invention.

In the present invention, the array substrate comprises a discharge unit, which can selectively conduct the data line connected thereto to the common electrode line connected thereto, to enable fast discharge of the storage capacitance corresponding to said data line, thus reducing the occurrence of afterimage phenomenon. Further, the array substrate may include an electrostatic protection unit and a test unit, all of the discharge unit, the electrostatic protection unit and the test unit are connected to the switching signal line, and therefore, the structure of the array substrate is simplified while reducing static electricity on the data line and enabling test of the liquid crystal screen.

BRIEF DESCRIPTION OF THE DRAWINGS

The accompanying drawings are used for providing further understanding of the present invention, constitute a part of the specification, and are intended to explain the present invention together with the following specific implementations, but do not constitute limitation on the present invention. In the accompanying drawings.

DETAILED DESCRIPTION OF THE EMBODIMENTS

Figure 1:
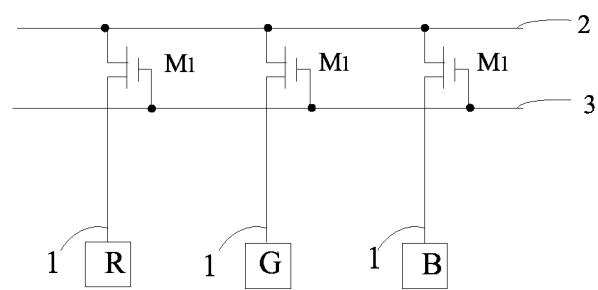
FIG. 1 is a schematic diagram of a structure of a discharge unit provided by an embodiment of the present invention.

The specific implementations of the present invention are described below in detail with conjunction with the accompanying drawings. It should be understood that the specific implementations described herein are merely used for describing and explaining the present invention, rather than limiting the present invention.

The present invention provides an array substrate comprising a plurality of data lines 1 and a plurality of common electrode lines 2, the array substrate further comprises at least one discharge unit, each discharge unit corresponds to one of the plurality of data lines 1, and is connected between the corresponding data line 1 and one of the plurality of common electrode lines 2, and each discharge unit can selectively conduct the data line 1 to the common electrode line 2 connected thereto.

Since at least one discharge unit is provided, the discharge unit can selectively conduct the data line 1 connected thereto to the common electrode line 2 connected thereto, thus achieving fast discharge of the storage capacitance corresponding to said data line 1.

It is well known that, the array substrate includes pixel electrodes connected to the data lines 1 and common electrodes corresponding to the pixel electrodes, and storage capacitances are formed between the pixel electrodes and the common electrodes. When a display panel comprising the array substrate displays an image, the storage capacitances formed between the pixel electrodes and the common electrodes are full charged, so that electric fields are formed between the pixel electrodes and the common electrodes to control rotation angle of liquid crystal molecules; at a time interval between two image frames, the display panel does not display an image, and the charges on the pixel electrodes and the pixel electrodes needs to be released.

The above "selectively conduction" refers to that, when the display panel does not display an image (i.e. at a time interval between two image frames), the discharge unit conducts the data line 1 to the common electrode line 2 connected thereto (for example, a control signal for displaying no image may be generated by a controller, and cause the discharge unit to conduct the data line 1 to the common electrode line 2), so that the storage capacitance corresponding to the data line 1 discharges; when the display panel display an image, the discharge unit disconnects the data line 1 connected thereto from the common electrode line 2 connected thereto (for example, a control signal corresponding to image displaying may be generated by a controller, and cause the discharge unit to disconnect the data line 1 from the common electrode line 2), at this point, the storage capacitance may be charged, and charge of the storage capacitance is maintained, thus the storage capacitance is used to generate an electric field for controlling rotation of liquid crystal molecules.

In the present invention, when the discharge unit conducts the data line 1 connected thereto to the common electrode lines 2 connected thereto, charges on the storage capacitance corresponding to said data line 1 may be quickly released to the common electrode line 2 through the discharge unit, thus achieving quick discharge of the storage capacitor, and further reducing the occurrence of afterimage phenomenon.

The number and structure of the discharge unit(s) are not limited in the present invention, as long as the data line 1 and the common electrode line 2 which are both connected to the discharge unit can be selectively conducted.

The manner in which the data line and the common electrode line 2 are selectively conducted is not specifically limited. For example, the discharge unit may include a controller and a switch controlled by the controller, and the controller controls the switch to be turned off when an image is displayed and controls the switch to be turned on when no image is displayed.

Figure 2:
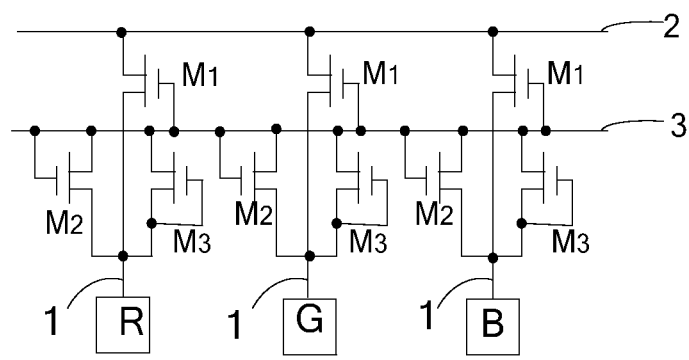
FIG. 2 is a schematic diagram illustrating structures of a discharge unit and an electrostatic protection unit provided by an embodiment of the present invention.

As a specific implementation of the present invention, the array substrate may comprise a driving circuit, as shown in FIGS. 1 and 2, the discharge unit comprises a first thin film transistor M1, a gate of which is connected to an output terminal of the driving circuit, one of a source and a drain of the first thin film transistor M1 is connected to the data line 1, and the other of the source and the drain is connected to the common electrode line 2. The driving circuit may output a drive signal at a time interval between two image frames to turn on the first thin film transistor M1, so that the data line 1 and the common electrode line 2 which are both connected to the first thin film transistor M1 are conducted.

In the present invention, the gate of the first thin film transistor M1 may be connected to the driving circuit directly or indirectly. As a preferable implementation, the array substrate further comprises a switching signal line 3 connected to the output terminal of the driving circuit, and the gate of the first thin film transistor M1 is connected to the switching signal 3, so as to be connected to the output terminal of the driving circuit indirectly via the switching signal line 3. The first thin film transistor M1 may be an N-type or P-type thin film transistor.

In a case that the first thin film transistor M1 is an N-type thin film transistor, when a display panel comprising the array substrate does not display an image, the driving circuit outputs a high-level signal, the first thin film transistor M1 is turned on, and the data line 1 connected to the first thin film transistor M1 and the common electrode line 2 connected to the first thin film transistor M1 are conducted, so that storage capacitance corresponding to the data line 1 connected to the first thin film transistor M1 discharges; when the display panel comprising the array substrate displays an image, the driving circuit outputs a low-level signal, the first thin film transistor M1 is turned off, the data line 1 connected to the first thin film transistor M1 and the common electrode line 2 connected to the first thin film transistor M1 are disconnected, and at this time, the storage capacitance may be charged and voltage across the storage capacitance is maintained.

In a case that the first thin film transistor M1 is an P-type thin film transistor, when a display panel comprising the array substrate does not display an image, the driving circuit outputs a low-level signal, the first thin film transistor M1 is turned on, and the data line 1 connected to the first thin film transistor M1 and the common electrode line 2 connected to the first thin film transistor M1 are conducted, so that storage capacitance corresponding to the data line 1 connected to the first thin film transistor M1 discharges; when the display panel comprising the array substrate displays an image, the driving circuit outputs a high-level signal, the first thin film transistor M1 is turned off, the data line 1 connected to the first thin film transistor M1 and the common electrode line 2 connected to the first thin film transistor M1 are disconnected, and at this time, the storage capacitance may be charged and voltage across the storage capacitance is maintained.

To enable quick discharge of all the storage capacitances corresponding to the plurality of data lines 1, preferably, as shown in FIG. 1, the array substrate may comprises a plurality of discharge units which are in a one-to-one correspondence with the plurality of data lines 1, and one discharge unit is provided between every data line 1 and one of the plurality of common electrode lines 2 (that is, the number of the plurality of discharge units is equal to that of the data lines in the array substrate), so that charges of the storage capacitance corresponding to each column of pixel electrodes may be released to the common electrode line 2 through the discharge unit, thus afterimage between two image frames can be effectively reduced.

Further, to make full use of the space of the array substrate, the common electrode line 2 connected to the discharge units may be the first common electrode line 2 among the plurality of common electrode lines 2, so as to reduce space occupied by the discharge units, which is advantageous for the manufacture of a product with narrow frames. Generally, the area of an array substrate is larger than that of an opposite substrate, that is, a first side of the array substrate protrudes from the opposite substrate, a second side, which is opposite to the first side, of the array substrate is aligned with the opposite substrate, and the "first" common electrode line refers to the first common electrode line arranged on the second side.

In the manufacturing process (e.g. rubbing, high-pressure spraying, etc.,) or use of an array substrate, it is easy to generate static electricity on a data line 1. To reduce or eliminate the static electricity on the data line, the array substrate further comprises at least electrostatic protection unit, each of which corresponds to one of the plurality of data lines 1, and is provided between the corresponding data line 1 and the switching signal line 3. As such, the static electricity on the data line 1 may be released onto the other data lines 1 connected to the switching signal line 3 through the electrostatic protection unit. For example, when the voltage of the static electricity on a certain data line 1 is relatively high, the static electricity on the certain data line 1 may be released to the switching signal line 3, and then be released to the other data lines 1 through the switching signal line 3. In the present invention, the electrostatic protection unit(s) and the discharge unit(s) may be connected to the same switching signal line 3, thus simplifying the structure of the circuit.

Figure 3:
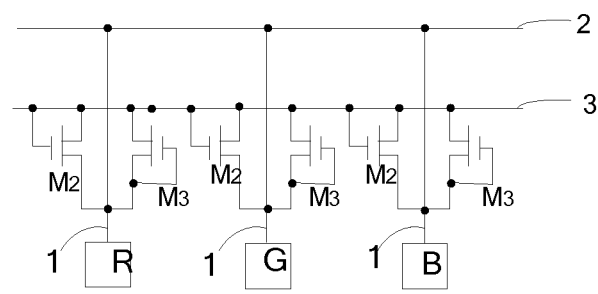
FIG. 3 is a schematic diagram of a structure of an electrostatic protection unit provided by an embodiment of the present invention.

Further, as shown in FIGS. 2 and 3, the electrostatic unit may comprises a second thin film transistor M2 and a third thin film transistor M3, the second thin film transistor M2 is a N-type thin film transistor and the third thin film transistor M3 is a P-type thin film transistor; alternatively, the second thin film transistor M2 is a P-type thin film transistor and the third thin film transistor M3 is a N-type thin film transistor. One of a source and a drain of the second thin film transistor M2 is connected to the switching signal line 3 and the other is connected to the data line 1, and a gate of the second thin film transistor M2 is connected to the switching signal line 3. One of a source and a drain of the third thin film transistor M3 is connected to the data line 1 and the other is connected to the switching signal line 3, and a gate of the third thin film transistor M3 is connected to the data line 1.

For example, as shown in FIG. 3, the second thin film transistor M2 is a P-type thin film transistor, both the source and the gate of the second thin film transistor M2 are connected to the switching signal line 3, and the drain of the second thin film transistor M2 is connected to the data line 1; the third thin film transistor M3 is a N-type thin film transistor, the source of the third thin film transistor M3 is connected to the switching signal line 3, and both the drain and the gate of the third thin film transistor M3 are connected to the data line 1. When voltage of the static electricity on the data line 1 is relatively high and positive, the voltage on the data line 1 is high level as compared to voltage on the switching signal line 3, and the voltage on the switching signal line 3 is a low level, at this time, the data line 1 controls the third thin film transistor M3 to be turned on, and the static electricity on the data line 1 is released to the switching signal line 3 through the third thin film transistor M3. When voltage of the static electricity on the data line 1 is relatively high and negative, similarly, the voltage on the data line 1 is a high level, and the voltage on the switching signal line 3 is a low level, at this time, the switching signal line 3 controls the second thin film transistor M2 to be turned on, and the static electricity on the data line 1 is released to the switching signal line 3 through the second thin film transistor M2.

Further, in order to reduce the static electricity on each data line 1, as shown in FIG. 3, the array substrate may comprise a plurality of electrostatic protection units which are in a one-to-one correspondence with the plurality of data lines 1, that is, the electrostatic protection unit is provided between every data line 1 and the switching signal line 3.

Figure 4:
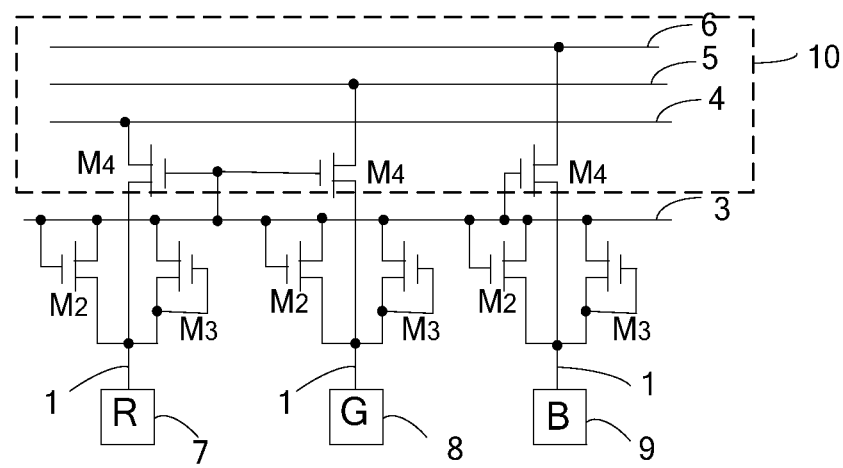
FIG. 4 is a schematic diagram illustrating structures of a test unit and an electrostatic protection unit provided by an embodiment of the present invention.
Figure 5:
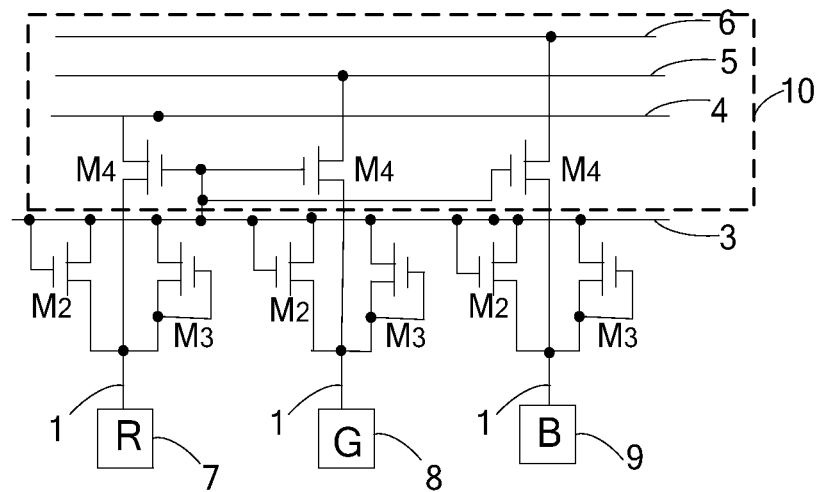
FIG. 5 is a schematic diagram illustrating another structure of a test unit and an electrostatic protection unit provided by an embodiment of the present invention.

To detect various defects (such as mura, bright line, etc.) during the manufacturing of a liquid crystal screen, as shown in FIGS. 4 and 5, the array substrate further comprises a test unit 10 connected to the data line 1, and the test unit 10 is configured to provide a test signal to the data line 1, so as to detect pixel regions corresponding to the data line 1 in the display panel.

Further, to facilitate providing, by the test unit 10, a signal to the data line 1 selectively (specifically, during a testing process of the liquid crystal screen, the test unit 10 provides a test signal to the data line 1; after the testing is completed, the test unit 10 no longer provides a test signal to the data line 1), as shown in FIGS. 4 and 5, the test unit 10 comprises a test line and at least one fourth thin film transistor M4, each of which corresponds to one of the plurality of data lines 1, and is connected between the corresponding data line 1 and the test line. Specifically, a gate of the fourth thin film transistor M4 is connected to the switching signal line 3, one of a source and a drain of each fourth thin film transistor M4 is connected to the corresponding data line 1 and the other is connected to the test line.

It can be understood that, the test line is generally connected to a test power source, to selectively conduct the pixel regions corresponding to the data line 1 to the test power source. For example, the gate of the fourth thin film transistor M4 is connected to the switching signal line 3, the source is connected to the corresponding data line 1, and the drain is connected to the test line. Taking a case that the fourth thin film transistor M4 is a N-type thin film transistor as an example, when the liquid crystal screen is tested, the driving circuit outputs a high level, which is transmitted to the gate of the fourth thin film transistor M4 through the switching signal line 3 to turn on the fourth thin film transistor M4, thus the pixel electrode and the test line are conducted; after the test is completed, the driving circuit outputs a low level, which is transmitted to the gate of the fourth thin film transistor M4 through the switching signal line 3 to turn off the fourth thin film transistor M4, thus the pixel electrode and the test line are disconnected. Meanwhile, the test unit 10 is connected to the switching signal line 3, which avoids setting a separate switching signal line for the test unit 10, thus optimizing the structure of the array substrate while performing the test.

Further, a red pixel electrode 7, a green pixel electrode 8 and a blue pixel electrode 9 are provided in the pixel region of the array substrate, the red pixel electrode 7, the green pixel electrode 8 and the blue pixel electrode 9 are connected to the corresponding data lines respectively. In order to determine the causes of various defects in the test accurately, the test line may comprise a first test line 4 for providing a test signal to the red pixel electrode 7, a second test line 5 for providing a test signal to the green pixel electrode 8 and a third test line 6 for providing a test signal to the blue pixel electrode 9.

It should be understood that, the red pixel electrode 7, the green pixel electrode 8 and the blue pixel electrode 9 do not means that colors of the pixel electrodes themselves are red, green and blue, but refer to colors of the corresponding sub-pixels, that is, colors of color filters at positions corresponding to the sub-pixels are red, blue and green.

Further, as shown in FIGS. 4 and 5, the test unit comprises a plurality of fourth thin film transistors M4 which are in a one-to-one correspondence with the plurality of data lines 1, that is, one fourth thin film transistor M4 may be provided between every data line 1 and the test line, so as to provide a test signal to every data line 1.

The manner in which the gates of the plurality of fourth thin film transistor M4 and the switching signal line 3 are connected is not specifically limited.

As a specific implementation of the present invention, as shown in FIG. 4, the gates of the plurality of fourth thin film transistor M4 may be connected in pairs and then be connected to the switching signal line 3, for example, the gates of the two four thin film transistor M4 corresponding to the red pixel electrode 7 and the green pixel electrode 8 of the first pixel unit, respectively, are connected, and then connected to the switching signal line 3, while the blue pixel electrode 9 is directly connected to the switching signal line 3.

As another specific implementation of the present invention, as shown in FIG. 5, the gates of the four thin film transistor M4 corresponding to the red pixel electrode 7, the green pixel electrode 8 and the blue pixel electrode 9 in a same pixel region, respectively, are connected to each other, that is, the gates of the four thin film transistor M4 corresponding to the red pixel electrode 7, the green pixel electrode 8 and the blue pixel electrode 9 in the first pixel region, respectively, are connected to each other, and then are connected to the switching signal line 3.

As another aspect of the present invention, there is provided a display panel, which comprises an array substrate, wherein the array substrate is the above array substrate provided by the present invention.

In the present invention, the array substrate comprises a discharge unit, which can selectively connect the data line 1 connected thereto to the common electrode line 2 connected thereto, to achieve fast discharge of the storage capacitance corresponding to said data line, thus reducing the occurrence of afterimage phenomenon. Further, the array substrate may include an electrostatic protection unit and a test unit, all of the discharge unit, the electrostatic protection unit and the test unit are connected to the switching signal line 3, and therefore, the structure of the array substrate is simplified, while reducing the static electricity on the data line and testing the liquid crystal screen are achieved.

It can be understood that, the above implementations are merely exemplary implementations for explaining the principle of the present invention, but the present invention is not limited thereto. For those skilled in the art, various variations and improvements may be made without departing from the spirit and essence of the present invention, and these variations and improvements are also considered to be within the protection scope of the present invention.

The invention claimed is:

1. An array substrate for a display device, comprising a plurality of data lines and a plurality of common electrode lines, wherein, the array substrate further comprises at least one discharge unit, a driving circuit, a switching signal line connected to an output terminal of the driving circuit, and at least one electrostatic protection unit, each discharge unit corresponds to one of the plurality of data lines, and is connected between the corresponding data line and one of the plurality of common electrode lines, and each discharge unit is capable of selectively conducting the data line to the common electrode line connected thereto, wherein the discharge unit conducts the data line to the common electrode connected thereto only in a non-display period of the display device;

each of the at least one electrostatic protection unit corresponds to one of the plurality of data lines and is provided between the corresponding data line and the switching signal line, and static electricity on the data line is released to the switching signal line via the electrostatic protection unit; and each of the at least one electrostatic protection unit comprises a second thin film transistor and a third thin film transistor, wherein, the second thin film transistor is a N-type thin film transistor and the third thin film transistor is a P-type thin film transistor; or the second thin film transistor is a P-type thin film transistor and the third thin film transistor is a N-type thin film transistor; and one of a source and a drain of the second thin film transistor is connected to the switching signal line and the other is connected to the data line, a gate of the second thin film transistor is connected to the switching signal line, one of a source and a drain of the third thin film transistor is connected to the data line and the other is connected to the switching signal line, a gate of the third thin film transistor is connected to the data line.

2. The array substrate of claim 1, wherein, each discharge unit comprises a first thin film transistor, a gate of which is connected to the output terminal of the driving circuit, one of a source and a drain of which is connected to the data line, and the other of the source and the drain is connected to the common electrode line, and the driving circuit is capable of outputting a control signal which selectively turn on the first thin film transistor.

3. The array substrate of claim 2, wherein, the gate of each first thin film transistor is connected to the switching signal line, so as to be connected to the output terminal of the driving circuit via the switching signal line.

4. The array substrate of claim 3, wherein, the array substrate comprises a plurality of discharge units, the discharge units are in a one-to-one correspondence with the plurality of data lines and are provided between the plurality of data lines and one of the common electrode lines, respectively.

5. The array substrate of claim 4, wherein, the one of the common electrode lines connected to the plurality of discharge units is the first common electrode line of the plurality of common electrode lines.

6. The array substrate of claim 2, wherein, the array substrate comprises a plurality of discharge units, the discharge units are in a one-to-one correspondence with the plurality of data lines and are provided between the plurality of data lines and one of the common electrode lines, respectively.

7. The array substrate of claim 6, wherein, the one of the common electrode lines connected to the plurality of discharge units is the first common electrode line of the plurality of common electrode lines.

8. The array substrate of claim 1, wherein, the array substrate comprises a plurality of discharge units, the discharge units are in a one-to-one correspondence with the plurality of data lines and are provided between the plurality of data lines and one of the common electrode lines, respectively.

9. The array substrate of claim 8, wherein, the one of the common electrode lines connected to the plurality of discharge units is the first common electrode line of the plurality of common electrode lines.

10. The array substrate of claim 1, wherein, the array substrate comprises a plurality of electrostatic protection units, which are in a one-to-one correspondence with the plurality of data lines.

11. The array substrate of claim 1, further comprising a test unit, which is connected to at least one data line and is configured to provide a test signal to the at least one data line.

12. The array substrate of claim 11, wherein, the test unit comprises a test line and at least one fourth thin film transistor, each fourth thin film transistor corresponds to one data line and is connected between the corresponding data line and the test line, a gate of each fourth thin film transistor is connected to the switching signal line, one of a source and a drain of each fourth thin film transistor is connected to the corresponding data line and the other is connected to the test line.

13. The array substrate of claim 12, wherein, a red pixel electrode, a green pixel electrode and a blue pixel electrode are provided in each pixel region of the array substrate, the red pixel electrode, the green pixel electrode and the blue pixel electrode are connected to the corresponding data lines respectively, and the test line comprises a first test line for providing a test signal to the red pixel electrode, a second test line for providing a test signal to the green pixel electrode and a third test line for providing a test signal to the blue pixel electrode.

14. The array substrate of claim 13, wherein, the test unit comprises a plurality of fourth thin film transistors, which are in a one-to-one correspondence with the plurality of data lines, and gates of the fourth thin film transistors respectively corresponding to the red pixel electrode, the green pixel electrode and the blue pixel electrode in a same pixel region are connected with each other.

15. The array substrate of claim 12, wherein, the test unit comprises a plurality of fourth thin film transistors, which are in a one-to-one correspondence with the plurality of data lines.

16. A display panel, comprising an array substrate of claim 1.

\* \* \* \* \*